United States Patent [19]

Kipp et al.

[11] Patent Number: 5,409,048
[45] Date of Patent: Apr. 25, 1995

[54] AIRCRAFT WHEEL

[75] Inventors: Richard A. Kipp, West Carrollton; Robert L. Brundrett, Troy, both of Ohio

[73] Assignee: The B. F. Goodrich Company, Akron, Ohio

[21] Appl. No.: 91,106

[22] Filed: Jul. 13, 1993

[51] Int. Cl.⁶ .............................................. B60B 25/00
[52] U.S. Cl. ............................ 152/381.4; 152/396; 301/6.2
[58] Field of Search ............... 301/6.2, 9.1, 35.1, 301/64.3, 64.4, 95; 152/379.4, 381.4, 396

[56] References Cited

U.S. PATENT DOCUMENTS

| | | | |
|---|---|---|---|
| 3,067,796 | 12/1962 | Atkin | 152/410 |
| 4,438,797 | 3/1984 | Suchow | 152/410 |
| 4,683,930 | 8/1987 | Elam et al. | 152/410 |
| 4,706,723 | 11/1987 | Loeber et al. | 152/410 |
| 4,773,711 | 9/1988 | Griffiths et al. | 152/381.4 |
| 4,911,216 | 3/1990 | Yamoto et al. | 152/410 |
| 5,086,821 | 2/1992 | Russell et al. | 152/410 |
| 5,092,662 | 3/1992 | Meyers | 301/37.22 |
| 5,107,968 | 4/1992 | Delpassand | 301/6.2 X |

FOREIGN PATENT DOCUMENTS

| | | | |
|---|---|---|---|
| 316064 | 5/1958 | Switzerland | 301/40.3 |
| 2154519 | 9/1985 | United Kingdom | 152/381.4 |

*Primary Examiner*—Russell D. Stormer
*Attorney, Agent, or Firm*—Joseph Januszkiewicz

[57] ABSTRACT

An aircraft wheel for a pneumatic tire that has a generally cylindrical wheel section with an annular inboard rim flange and an annular outboard rim flange which seat the respective beads of the tire, The respective rim flanges have curvilinear configurations that extend radially outwardly from each other with the curvilinear portion of the inboard rim flange having a radius of curvature that is based on a single radius of curvature while the curvilinear portion of the outboard rim flange has a compound radius defining an outboard rim flange that has a greater radial dimension than the inboard rim flange.

12 Claims, 3 Drawing Sheets

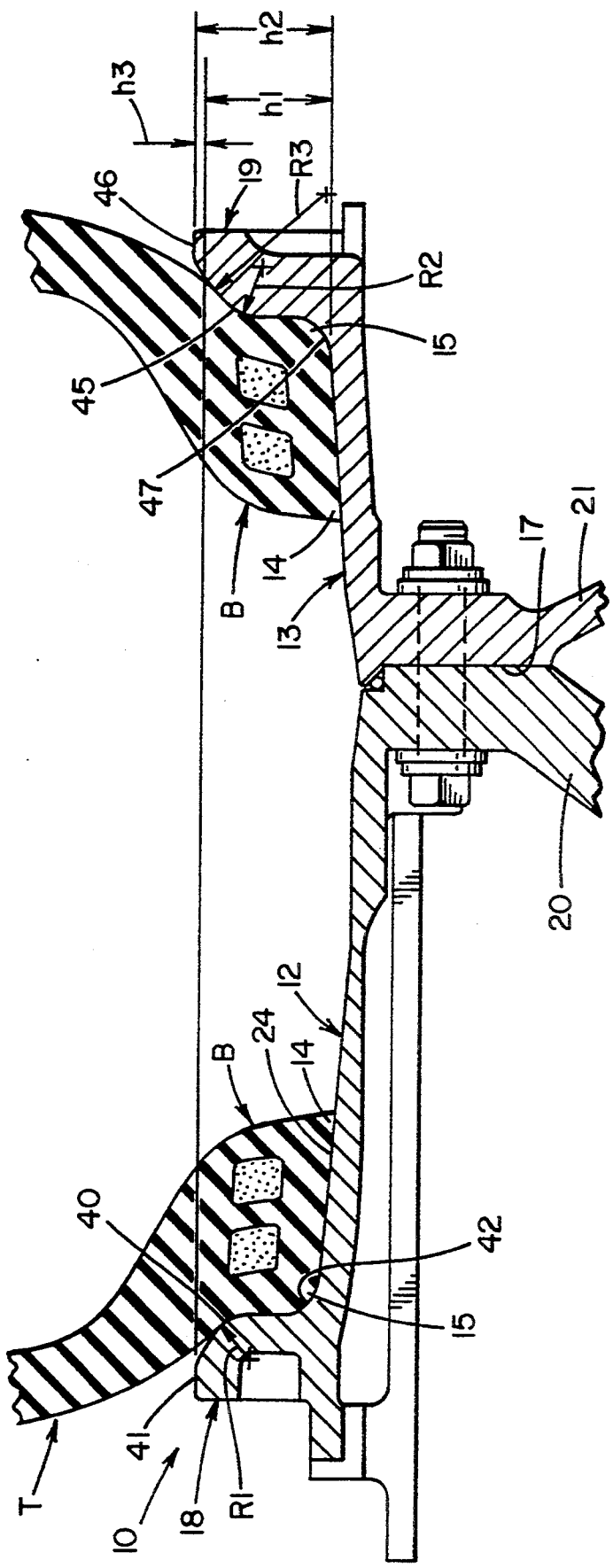

AIRCRAFT WHEEL

BACKGROUND OF THE INVENTION

This invention relates to aircraft wheel assemblies and more particularly to a new and improved aircraft wheel structure that has a rim profile that improves performance of the tire thereon while maintaining its lightweight structure.

In the mounting of a pneumatic tire on a wheel of an aircraft, it is essential to provide a lightweight wheel assembly to minimize overall weight but it is also necessary to provide a wheel structure that has the ability to withstand the tremendous impact forces encountered when the supporting aircraft lands onto a runway. As aircraft get larger and larger in load carrying capacity, the impact forces cause increased deflection and wheel flange loading and it is necessary to provide an overload safety factor in their design to assure a safe landing under variable conditions of load and overload as where the approaching aircraft comes in at a steep angle or on one side of the supporting boogie wheels, which touch ground before the adjacent wheels due to unusual weather and wind conditions. The wheel base and the side rim members must absorb these impact forces. The present invention is directed to an improvement in design of the respective flanges on the wheel base and flange rim members (inboard and outboard rim flanges) to better absorb the impact forces transmitted by the pneumatic tire to the aircraft wheel to assure improved performance under adverse landing conditions or under conditions wherein other tires on the same landing gear may experience blow out, thereby sharply increasing loadings on remaining inflated tires and their respective wheels.

SUMMARY OF THE INVENTION

The present invention contemplates an aircraft wheel that has a cylindrical base section with an inboard rim flange having a curvilinear portion that cooperates with an adjacent portion of the base section to support one bead of a tire and with an outboard rim flange having a curvilinear portion with a compound radius that gives it greater radial height over the inboard rim flange, which outboard rim flanges cooperates with an adjacent portion of the base section to support the remaining bead of a tire.

BRIEF DESCRIPTION OF THE DRAWINGS

FIG. 4 is a cross-sectional view of a portion of an aircraft wheel showing the respective rim flanges and the bead portion of a tire mounted thereon.

DETAILED DESCRIPTION

Figure 1:
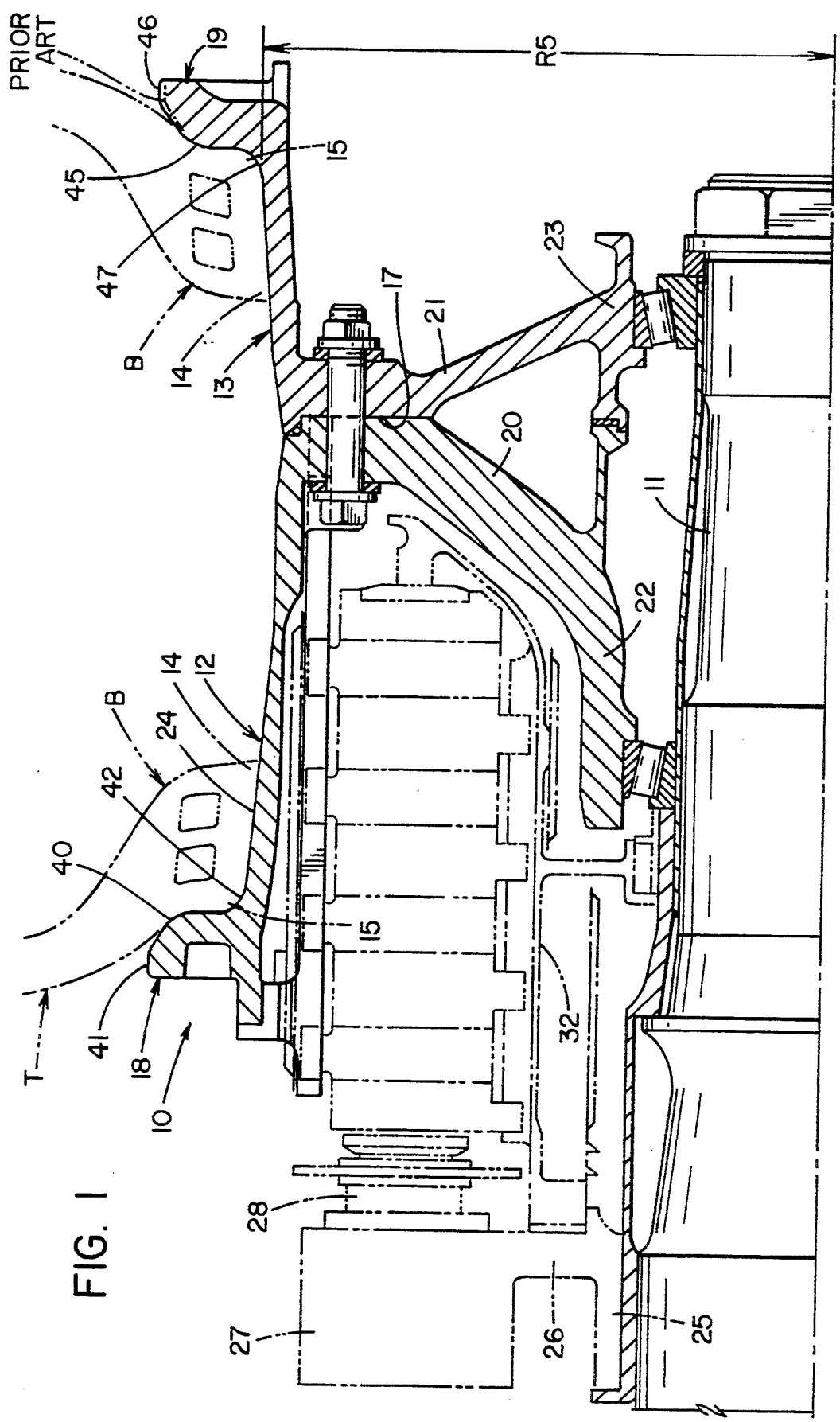
FIG. 1 is a fragmentary cross-sectional view of one-half of an aircraft wheel with the brake discs in phantom outline.
Figure 3:
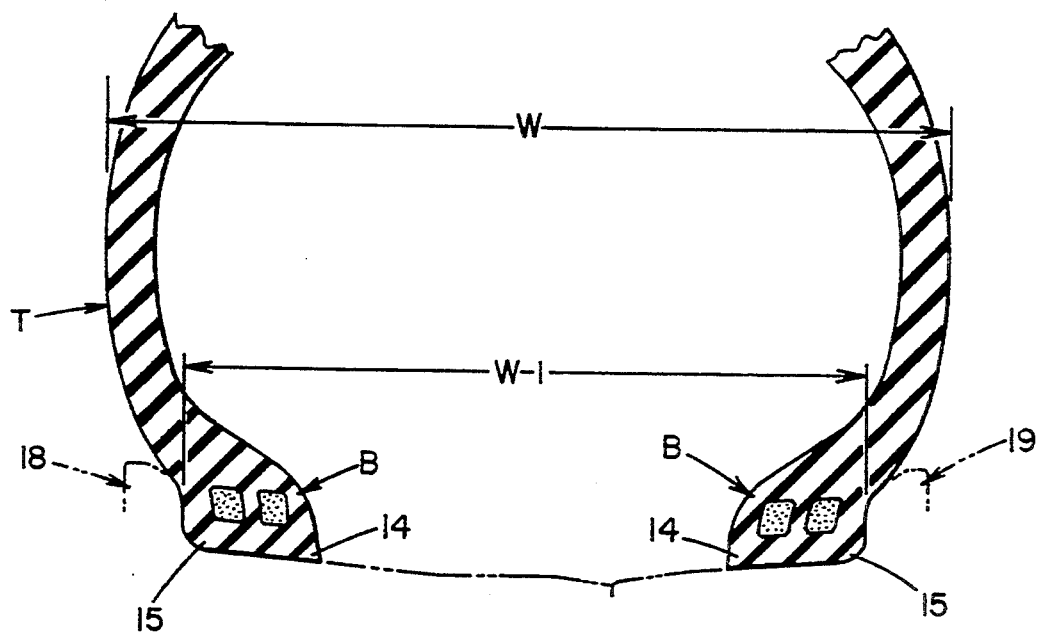
FIG. 3 is a fragmentary cross-sectional view of the bead portion of a tire and part of the sidewall.

Referring to the drawings, wherein like reference numerals designate like or corresponding parts throughout the several views, there is shown in FIG. 1 an aircraft wheel 10 for mounting on a nonrotatable axle 11. Such aircraft wheel 10 has a first wheel section 12 and a second wheel section 13 which wheel sections support a tire T mounted thereon (FIG. 3). Tire T has a pair of axially spaced beads designated B with each bead having a toe 14 and a heel 15. The nominal width W of the tire T is considered the cross sectional distance W between the respective side walls and the distance between the spaced heels 15 is W−1, the nominal width of the wheel that supports the tire T.

Each of the wheel sections 12 and 13 have a rim flange 18 and 19, web members 20 and 21, and hub members 22 and 23. The wheel sections 12 and 13 are fastened together by suitable bolts disposed in aligned bores within web members 20 and 21 to form an integral unit wheel. The rim flange 18 is the inboard rim flange and rim flange 19 is the outboard rim flange.

The hub members 22 and 23 are supported for rotation on suitable bearings which are mounted on the nonrotatable axle member 11. Mounted on axle member 11 is a hub 25, which hub has a radially extending flange 26 that supports a piston housing 27 and pistons 28. Flange 26 has suitably secured to it a torque tube or torque tube member 32 with its radially outwardly extending reaction plate. Torque tube 32 has a plurality of circumferentially spaced axially extending splines that support nonrotatable stator brake discs. Wheel section 12 has a plurality of circumferentially spaced ribs or rib members suitably connected thereto to support for axial movement thereon and for rotation therewith rotor brake discs which cooperate with the nonrotatable brake discs as is well known in the art and define a brake stack as is shown in phantom lines in FIG. 1.

Cylindrical wheel section 12 has an outer annular surface 24 that tapers outwardly from its one end portion towards its other edge portion that forms the inboard rim flange 18. The one end portion has a large flat annular surface that abuttingly engages a flat annular surface 17 of the web member 21 of the second wheel section 13 to facilitate the joining of the wheel sections 12 and 13. As illustrated in FIG. 1 the distance from the inboard rim flange 18 to the outboard rim flange 19 provides an axially elongated wheel 10 to accommodate the elongated aircraft brake stack (stator and rotor disks) which includes the torque tube shown in phantom lines.

Figure 2:
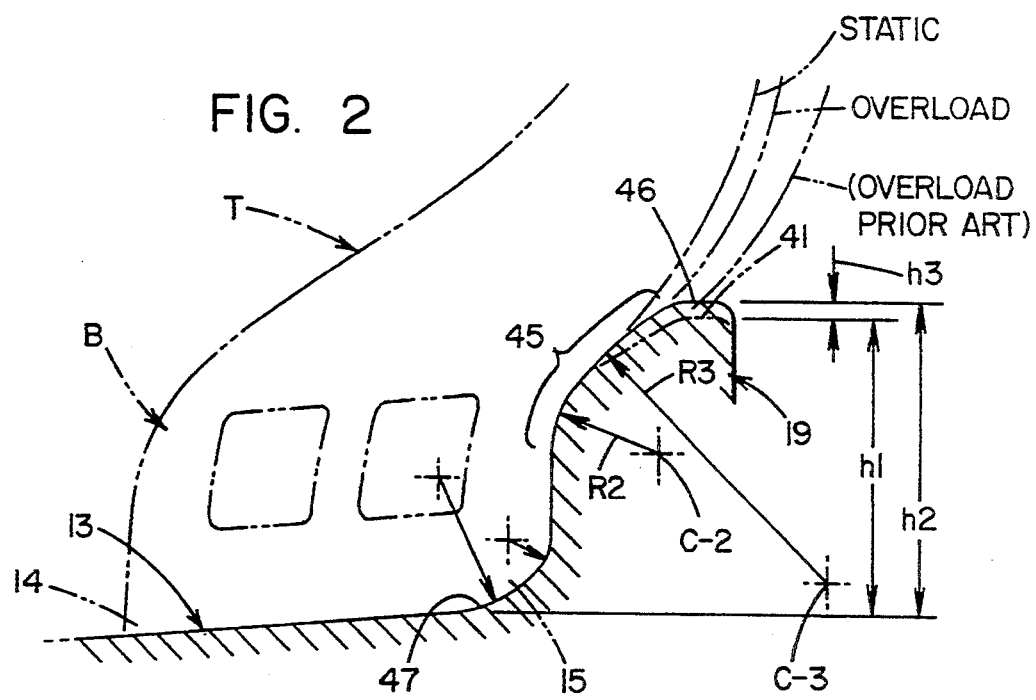
FIG. 2 is an enlarged fragmentary view of the outboard rim flange of the aircraft wheel shown in FIG. 1.

The respective inboard rim flange 18 and the outboard rim flange 19 are curvilinear in configuration and extend radially outwardly away from each other. As seen in FIG. 4, the outer surface 40 of the inboard rim flange 18 has a constant arcuate surface in cross section with a flange radius R1 which terminates at one end into a horizontally extending line 41 while terminating at the other end into a concave arc 42 that snugly receives the heel 15 of a tire bead B. The outer surface 40 may terminate at its one end into a rounded portion of the flange rather than linear line 41 for ease of manufacture. The agreement between manufacturers has accepted a standard list of rim contours which was drawn up for all tire sizes. As depicted in FIG. 3, the nominal rim width W−1 used to be approximately 60-65 percent of the tire height (the radial from the tire bead to the outer surface of the tire tread) "h", but presently for aircraft tires such width W−1 can be over 70 percent of the tire height, which width W−1 hereinafter means a wide base rim to distinguish them over narrower base rim under 70%. The outboard rim flange 19 has an outer surface 45 that is curvilinear based on two compound radii R2 and R3, wherein R3 is substantially greater than R2. The center of radius R2 is C−2 while the center of radius R3 is designated C−3 in FIG. 2. By substantially greater it is meant that R3 is at least 25% greater in length than R2. The preferred form is to have R3 twice the size of R2. By compound radius it is meant that the curve is produced by the use of two or more radii. The preferred compound radii are two. The curvature of the outer surface 45 from radius R3 merges into the curvature on the outer surface from radius R2 and is herein referred to as a compound curve which is a curvature resulting from two or more radii. Thus the one end of the curve from radius R3 merges with the one end of the curve from radius R2. The other end, of the curve from radius R3 terminates into a linear line (as viewed in cross-section of the rim flange) 46 while the other end of the curve from radius R2 terminates or merges into a concave arc 47 that snugly receives the other heel B of the tire T as depicted in FIG. 4. By using the compound radius the differential in height of the outboard rim flange 19 over the height of the inboard rim flange is increased as shown in FIG. 2. The height of the inboard flange is designated h1, while the height of the outboard flange is designated h2, with the difference being h3. Flange height is determined by the distance from the bead seat to the uppermost portion of the flange curve. The increased height of the outboard rim flange 19 over the height of the inboard flange 18 in the example shown is approximately 6% and the range can vary from 5% to 15% giving substantially increased performance. By so increasing the differential there is a lower wheel stress for a given load permitting the wheel weight to be optimized. In addition the new and improved rim flanges allow the tire to sustain higher overloads giving lower tire stresses for a given load. It should be noted that the nominal rim width as previously discussed provides an enlarged envelope from the inboard rim flange to the web member 20 to house the brake rotors and stators of the braking means. As an example the ratio of the nominal rim width to the radius R5 of the wheel rim as shown in FIG. 1 is greater than 0.75.

Various modifications are contemplated and may obviously be resorted to by those skilled in the art without departing from the described invention, as hereinafter defined by the appended claims, as only preferred embodiment thereof has been disclosed.

We claim:

1. An aircraft wheel for a pneumatic tire comprising a first wheel section with a cylindrical base and an annular inboard rim flange integral therewith; said base having a radially inwardly extending portion that terminates into a hub for mounting on an axle of an aircraft; said base having a bead seating portion adjacent to and cooperative with said inboard rim flange to define a concavity which is a first bead seat for receiving a bead of a tire mounted on said aircraft wheel; a second wheel section having an annular bead seating portion of the same diameter as said first bead seat and an annular outboard rim flange integral therewith to define a second bead seat; said first wheel section and said second wheel section secured together to define art integral wheel; said bead seating portion of said second wheel section being adjacent to and cooperative with said outboard rim flange to define a concavity for receiving the other bead of a tire; said inboard rim flange and said outboard rim flange having convex curvilinear portions that extend radially outwardly away from each other to abut solely the beads of a tire; and said convex curvilinear portion of said outboard rim flange has compound radii to give said outboard rim flange increased height over the height of said inboard rim flange to thereby provide increased overload capacity to a tire mounted on said wheel.

2. An aircraft wheel for a pneumatic tire as set forth in claim 1 wherein said compound radii is based on two radii, and one of said radius is substantially greater than the other one of said two radii.

3. An aircraft wheel for a pneumatic tire as set forth in claim 1 wherein said compound radius is based on two radii, and one of said radius is approximately twice the length of said other one of said two radii.

4. An aircraft wheel for a pneumatic tire as set forth in claim 1 wherein said compound radii is based on at least two radii, one of said radii merges into that portion of said base that defines a concave shape for receiving the heel of a tire bead, and the remaining radii of said compound radii is of a length that is substantially greater than said one radii to form the remainder of said outboard rim flange that support the remainder of the tire bead.

5. An aircraft wheel for a pneumatic tire as set forth in claim 1 wherein the nominal rim width of said wheel is over 70% of the tire height is radius that is mounted on said aircraft wheel.

6. An aircraft wheel for a pneumatic tire as set forth in claim 5 wherein said compound radius is based on two radii, and one of said radius is substantially greater than the other one of said radius.

7. An aircraft wheel for a pneumatic tire as set forth in claim 1 wherein said increased height of said outboard rim flange over said inboard rim flange has a greater differential than Tire and Rim Association Guideline AC-50-C.

8. An aircraft wheel for a pneumatic tire as set forth in claim 7 wherein said compound radius has a first radius and a second radius, and said second radius is at least twice said first radius.

9. A wheel for a pneumatic tire wherein such wheel has a general cylindrical base and a pair of axially spaced rim flanges; each of said rim flanges being annular in shape with an outer surface; one of said rim flanges being an inboard rim flange and the other one of said rim flanges being an outboard rim flange; said outer surfaces of said rim flanges that joins said base defines a pair of axially spaced concave surfaces for receiving the heels of tire beads; said outer surfaces of the remaining portions of said rim flanges being convex in shape to receive the remaining portions of the tire beads, and said convex shape of said outboard rim flange has a compound radii to improve impact forces on a tire mounted on said wheel and to increase the height of said outboard rim flange over said inboard rim flange.

10. A wheel for a pneumatic tire as set forth in claim 9 wherein said convex shape of said inboard rim flange has a curvature based on a single radius, and said compound radii is based on two radii.

11. A wheel for a pneumatic tire as set forth in claim 9 wherein said compound radii of said outboard rim flange increases the height of said outboard rim flange over the height of said inboard rim flange in a range between 6% to 15%.

12. A wheel for a pneumatic tire as set forth in claim 11 wherein said convex outer surface of said inboard rim flange has a constant arcuate surface in cross section based on a single radius of curvature whereas said convex shape of said outboard rim flange has a compound curve.

* * * * *